US012588090B2

(12) United States Patent
Xie et al.

(10) Patent No.: US 12,588,090 B2
(45) Date of Patent: Mar. 24, 2026

(54) METHOD FOR PROTOCOL STACK SHARING IN DUAL CONNECTIVITY

(71) Applicant: QUALCOMM Incorporated, San Diego, CA (US)

(72) Inventors: Ling Xie, Beijing (CN); Bhupesh Manoharlal Umatt, Poway, CA (US); Reza Shahidi, La Jolla, CA (US); Qingxin Chen, San Diego, CA (US); Shan Qing, Shenzhen (CN); Mutaz Zuhier Afif Shukair, San Diego, CA (US); Tom Chin, San Diego, CA (US); Hemanth Kumar Rayapati, San Diego, CA (US); Tongxin Wang, Shanghai (CN); Daniel Amerga, San Diego, CA (US); Peng Hu, Beijing (CN); Xuqiang Zhang, Beijing (CN); Xiaoyu Li, Beijing (CN); Liang Hong, Beijing (CN); Zhongsheng Li, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/004,121

(22) PCT Filed: Aug. 28, 2020

(86) PCT No.: PCT/CN2020/112100
§ 371 (c)(1),
(2) Date: Jan. 3, 2023

(87) PCT Pub. No.: WO2022/041115
PCT Pub. Date: Mar. 3, 2022

(65) Prior Publication Data
US 2023/0319920 A1 Oct. 5, 2023

(51) Int. Cl.
*H04W 76/15* (2018.01)
*H04W 8/18* (2009.01)
*H04W 88/06* (2009.01)

(52) U.S. Cl.
CPC .......... *H04W 76/15* (2018.02); *H04W 8/183* (2013.01); *H04W 88/06* (2013.01)

(58) Field of Classification Search
CPC ...... H04W 8/183; H04W 76/15; H04W 88/06
See application file for complete search history.

(56) References Cited

U.S. PATENT DOCUMENTS

2013/0303203 A1* 11/2013 Wang .................... H04W 68/00
455/458
2019/0109697 A1 4/2019 Lee et al.
(Continued)

FOREIGN PATENT DOCUMENTS

| CN | 110771254 | | 2/2020 |
| CN | 111225424 | A | 6/2020 |
| WO | WO-2017169301 | A1 | 10/2017 |

OTHER PUBLICATIONS

Huawei, et al., "Discussion on the Remaining Issues of LTE-NR DC and UL Coexistence", 3GPP TSG RAN WG1 Meeting NR#3, 3GPP TSG RAN WG1 adhoc_NR_AH_1709, 3GPP Draft, R1-1715429, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, 13 Pages, Sep. 17, 2017, XP051338897, Sep. 11, 2017.
(Continued)

*Primary Examiner* — Brian P Cox
(74) *Attorney, Agent, or Firm* — QUALCOMM Incorporated

(57) ABSTRACT

Methods, systems, and devices for wireless communications are described. A user equipment (UE) may be configured with two subscriptions. The first subscription may support
(Continued)

Idle-mode Signaling 205

Subscription Configuration 210-a

Subscription Configuration 210-b

200 dual connectivity with one or more cell groups, such as a master cell group (MCG) and a secondary cell group (SCG), while a second subscription may not support dual connectivity. Each subscription may support communications with one or more radio access technologies (RAT). The UE may use the protocol stack for a RAT in the first subscription to receive idle-mode signaling, such as one or more paging messages, from the second subscription using the same RAT.

40 Claims, 11 Drawing Sheets

(56) References Cited

U.S. PATENT DOCUMENTS

| | | | |
|---|---|---|---|
| 2020/0169922 A1 | 5/2020 | Ozturk | |
| 2021/0014667 A1* | 1/2021 | Lovlekar | .............. H04W 12/72 |
| 2021/0282103 A1* | 9/2021 | Zhu | ....................... H04W 76/15 |

OTHER PUBLICATIONS

International Search Report and Written Opinion—PCT/CN2020/112100—ISA/EPO—Jun. 2, 2021 (205720WO1).

* cited by examiner 110-c 125-c 105-c 105-a 115-a 125-b 125-a 105-b 110-b 110-a

Idle-mode Signaling 205

Subscription Configuration
210-a

Subscription Configuration
210-b

200

Figure 9:
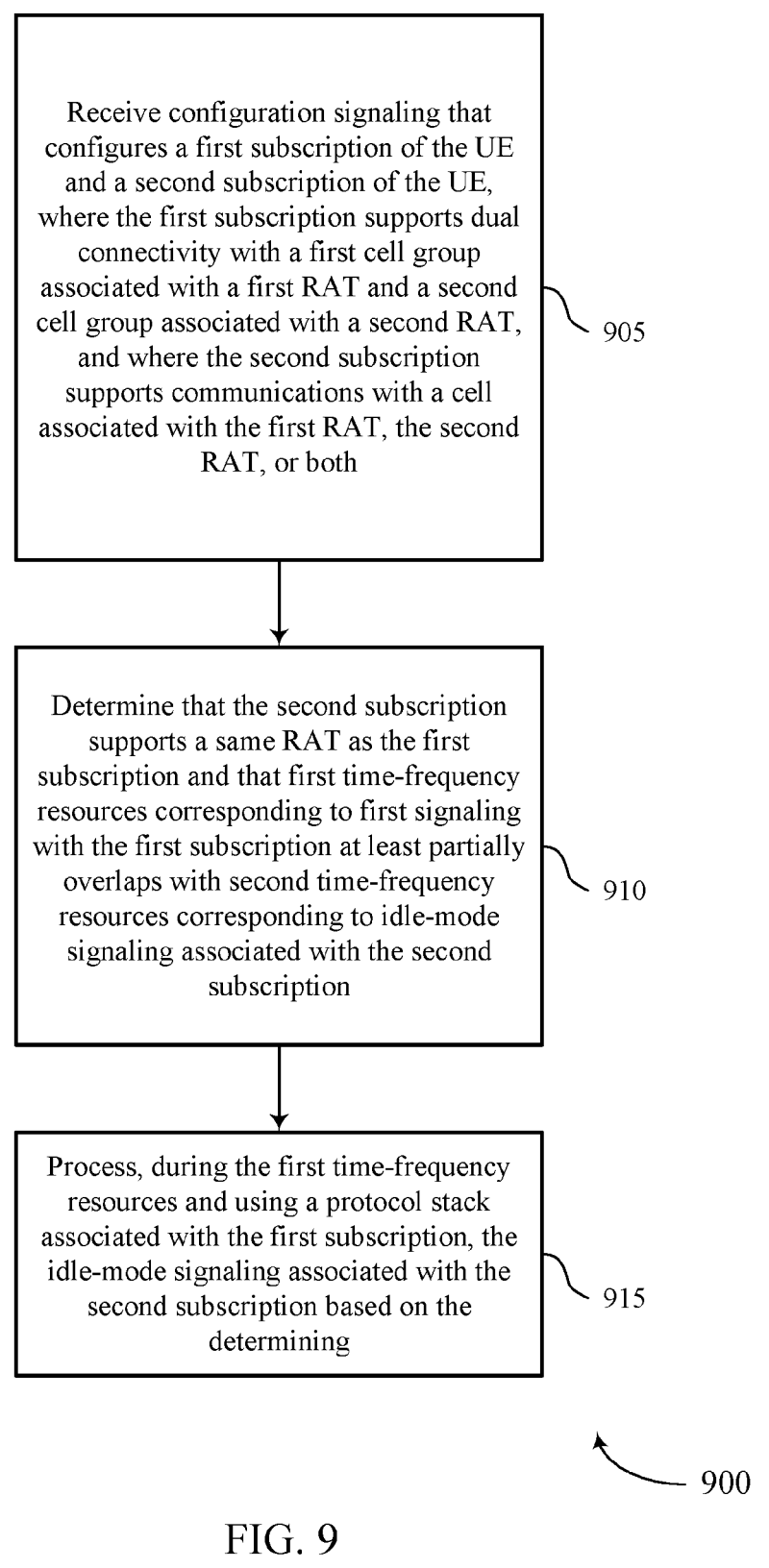

Receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both

905

Determine that the second subscription supports a same RAT as the first subscription and that first time-frequency resources corresponding to first signaling with the first subscription at least partially overlaps with second time-frequency resources corresponding to idle-mode signaling associated with the second subscription

910

Process, during the first time-frequency resources and using a protocol stack associated with the first subscription, the idle-mode signaling associated with the second subscription based on the determining

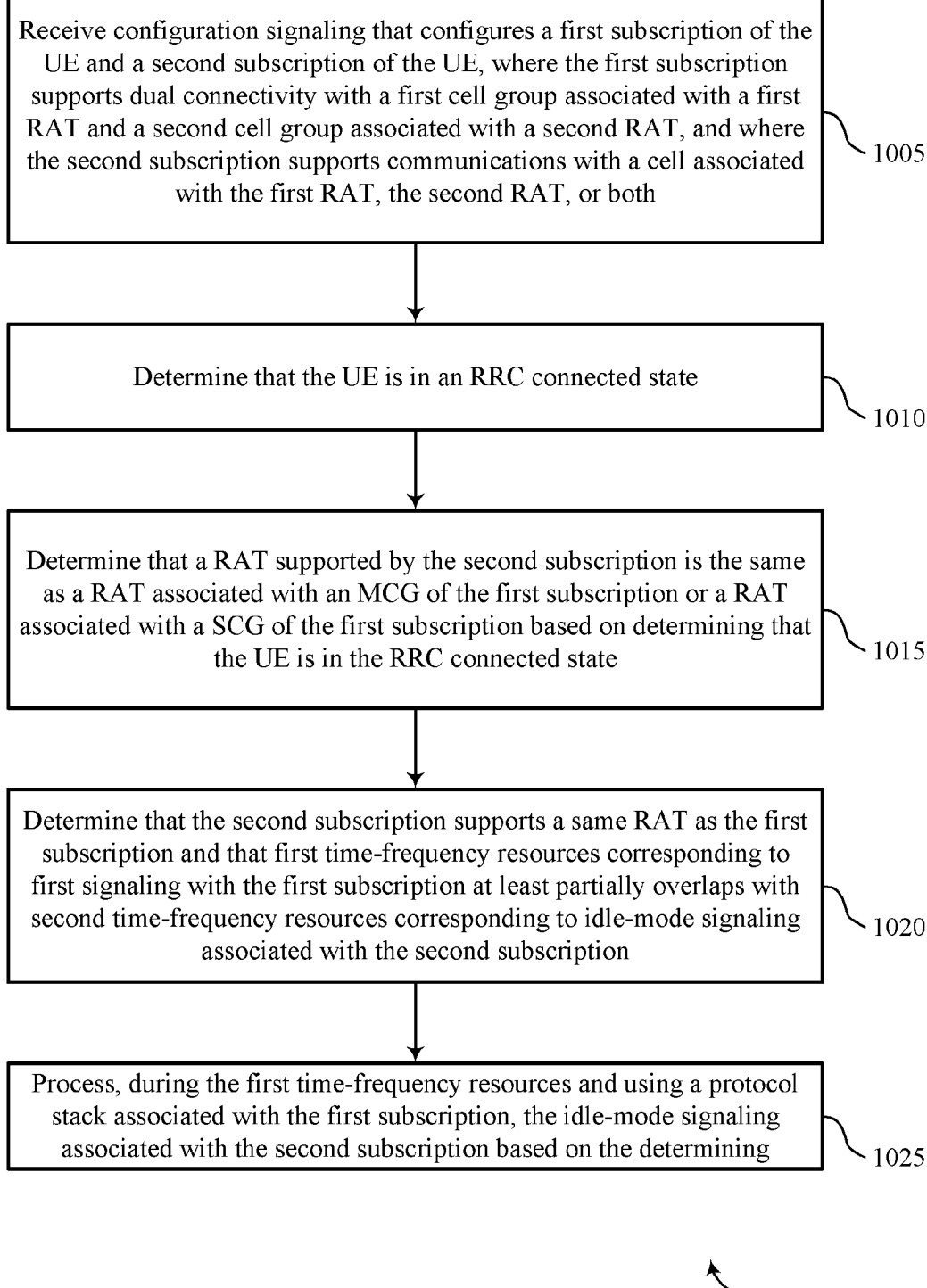

Receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both

1005

Determine that the UE is in an RRC connected state

1010

Determine that a RAT supported by the second subscription is the same as a RAT associated with an MCG of the first subscription or a RAT associated with a SCG of the first subscription based on determining that the UE is in the RRC connected state

1015

Determine that the second subscription supports a same RAT as the first subscription and that first time-frequency resources corresponding to first signaling with the first subscription at least partially overlaps with second time-frequency resources corresponding to idle-mode signaling associated with the second subscription

1020

Process, during the first time-frequency resources and using a protocol stack associated with the first subscription, the idle-mode signaling associated with the second subscription based on the determining

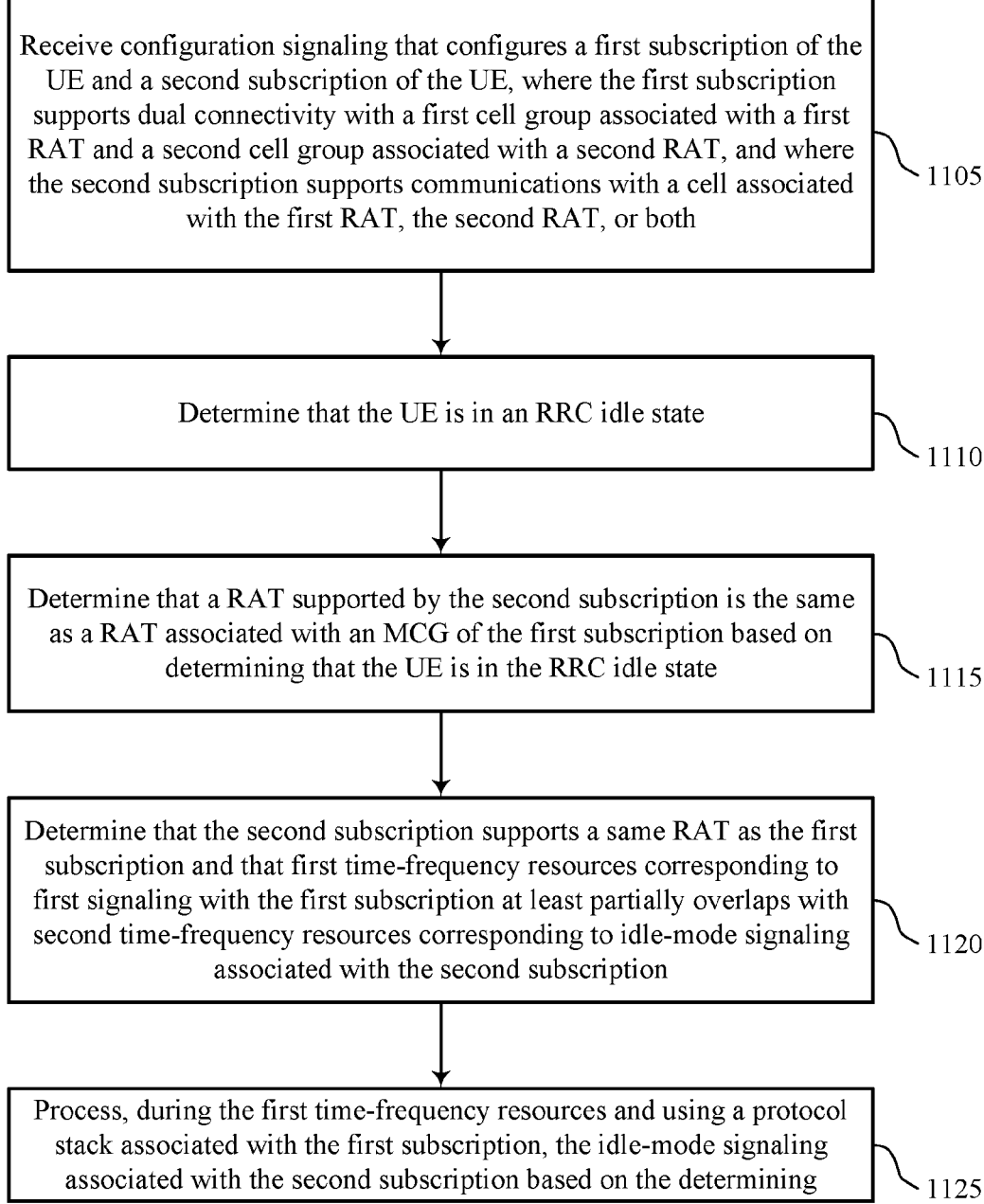

Receive configuration signaling that configures a first subscription of the
UE and a second subscription of the UE, where the first subscription
supports dual connectivity with a first cell group associated with a first
RAT and a second cell group associated with a second RAT, and where
the second subscription supports communications with a cell associated
with the first RAT, the second RAT, or both

1105

Determine that the UE is in an RRC idle state

1110

Determine that a RAT supported by the second subscription is the same
as a RAT associated with an MCG of the first subscription based on
determining that the UE is in the RRC idle state

1115

Determine that the second subscription supports a same RAT as the first
subscription and that first time-frequency resources corresponding to
first signaling with the first subscription at least partially overlaps with
second time-frequency resources corresponding to idle-mode signaling
associated with the second subscription

1120

Process, during the first time-frequency resources and using a protocol
stack associated with the first subscription, the idle-mode signaling
associated with the second subscription based on the determining

METHOD FOR PROTOCOL STACK SHARING IN DUAL CONNECTIVITY

CROSS REFERENCE

The present Application is a 371 national stage filing of International PCT Application No. PCT/CN2020/112100 by XIE et al. entitled "A METHOD FOR PROTOCOL STACK SHARING IN DUAL CONNECTIVITY," filed Aug. 28, 2020, which is assigned to the assignee hereof, and which is expressly incorporated by reference in its entirety herein.

FIELD OF TECHNOLOGY

The following relates to wireless communications, including a method for protocol stack sharing in dual connectivity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support a method for protocol stack sharing in dual connectivity. Generally, the described techniques provide for a user equipment (UE) to be configured with multiple subscriptions (e.g., two subscriptions) in a multiple subscriber identity module (MSIM) configuration. In some cases, a first subscription of the UE may support dual connectivity such that the UE may maintain concurrent communications or connections with two or more cell groups, such as a master cell group (MCG) and a secondary cell group (SCG). The MCG and SCG may be associated with the same or different radio access technologies (RATs). A second subscription may support communications with a single RAT. Each RAT may be associated with a protocol stack. In some examples, the RAT for a cell group from the first subscription may be the same as the RAT for the second subscription. In such examples, the UE may use the protocol stack for the RAT in the first subscription to receive idle-mode signaling, such as one or more paging messages, for the second subscription.

A method of wireless communications at a UE is described. The method may include receiving configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both, determining that the second subscription supports a same RAT as the first subscription and that first time-frequency resources corresponding to a first transmission associated with the first subscription at least partially overlaps with second time-frequency resources corresponding to idle-mode signaling associated with the second subscription, and processing, during the first time-frequency resources and using a protocol stack associated with the first subscription, the idle-mode signaling associated with the second subscription based at least in part on the determining.

An apparatus for wireless communications at a UE is described. The apparatus may include a processor, memory coupled with the processor, and instructions stored in the memory. The instructions may be executable by the processor to cause the apparatus to receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both, determine that the second subscription supports a same RAT as the first subscription and that first time-frequency resources corresponding to a first transmission associated with the first subscription at least partially overlaps with second time-frequency resources corresponding to idle-mode signaling associated with the second subscription, and process, during the first time-frequency resources and using a protocol stack associated with the first subscription, the idle-mode signaling associated with the second subscription based at least in part on the determining.

Another apparatus for wireless communications at a UE is described. The apparatus may include means for receiving configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both, determining that the second subscription supports a same RAT as the first subscription and that first time-frequency resources corresponding to a first transmission associated with the first subscription at least partially overlaps with second time-frequency resources corresponding to idle-mode signaling associated with the second subscription, and processing, during the first time-frequency resources and using a protocol stack associated with the first subscription, the idle-mode signaling associated with the second subscription based at least in part on the determining.

A non-transitory computer-readable medium storing code for wireless communications at a UE is described. The code may include instructions executable by a processor to receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both, determine that the second subscription supports a same RAT as the first subscription and that first time-frequency resources corresponding to a first transmission associated with the first subscription at least partially overlaps with second time-frequency resources corresponding to idle-mode signaling associated with the second subscription, and process, during the first time-frequency resources and using a protocol stack associated with the first subscription, the idle-mode signaling associated with the second subscription based at least in part on the determining.

In some examples of the method, apparatuses, and non-transitory computer-readable medium described herein, determining that the second subscription supports the same RAT as the first subscription may include operations, features, means, or instructions for determining that the UE may be in a RRC connected state, and determining that a RAT supported by the second subscription may be the same as a RAT associated with a master cell group of the first subscription or a RAT associated with a secondary cell group of the first subscription based on determining that the UE may be in the RRC connected state.

In some examples of the method, apparatuses, and non-transitory computer-readable medium described herein, determining that the second subscription supports the same RAT as the first subscription may include operations, features, means, or instructions for determining that the UE may be in a RRC idle state, and determining that a RAT supported by the second subscription may be the same as a RAT associated with a master cell group of the first subscription based on determining that the UE may be in the RRC idle state.

In some examples of the method, apparatuses, and non-transitory computer-readable medium described herein, receiving the idle-mode transmissions may include operations, features, means, or instructions for determining that the cell and one or more additional cells associated with the second subscription may be associated with a same operator and may have a same tracking area, and receiving the idle-mode transmissions from the cell associated with the second subscription.

In some examples of the method, apparatuses, and non-transitory computer-readable medium described herein, determining that the first time-frequency resources corresponding to the first transmission at least partially overlaps with the second time-frequency resources corresponding to the idle-mode transmissions may include operations, features, means, or instructions for receiving an indication of a first set of one or more parameters from a cell in the first cell group or the second cell group associated with the first subscription and a second set of one or more parameters from the cell associated with the second subscription, and determining the first set of one or more parameters at least partially overlaps with the second set of one or more parameters. In some cases, the first set of one or more parameters and the second set of one or more parameters comprise a frequency bandwidth, a cell identifier, a public land mobile network (PLMN) identifier, a master information block (MIB), a system information block (SIB), or a combination thereof.

In some examples of the method, apparatuses, and non-transitory computer-readable medium described herein, one or more cells in the first cell group or the second cell group associated with the first subscription and the cell associated with the second subscription correspond to a same operator.

In some examples of the method, apparatuses, and non-transitory computer-readable medium described herein, receiving the idle-mode transmission may include operations, features, means, or instructions for receiving the idle-mode transmissions associated with the second subscription based on the cell associated with the second subscription roaming from a first operator to a second operator, where one or more cells in the first cell group or the second cell group associated with the first subscription may be associated with the second operator.

Some examples of the method, apparatuses, and non-transitory computer-readable medium described herein may further include operations, features, means, or instructions for determining the one or more cells in the first cell group or the second cell group associated with the first subscription and the cell associated with the second subscription correspond to a same base station.

Some examples of the method, apparatuses, and non-transitory computer-readable medium described herein may further include operations, features, means, or instructions for using the protocol stack associated with the first subscription based on the additional protocol stack and the protocol stack being the same.

In some examples of the method, apparatuses, and non-transitory computer-readable medium described herein, the first RAT is LTE or NR, the second RAT is LTE or NR, or a combination.

BRIEF DESCRIPTION OF THE DRAWINGS

FIGS. 9 through 11 show flowcharts illustrating methods that support a method for protocol stack sharing in dual connectivity in accordance with aspects of the present disclosure.

DETAILED DESCRIPTION

Figure 1:
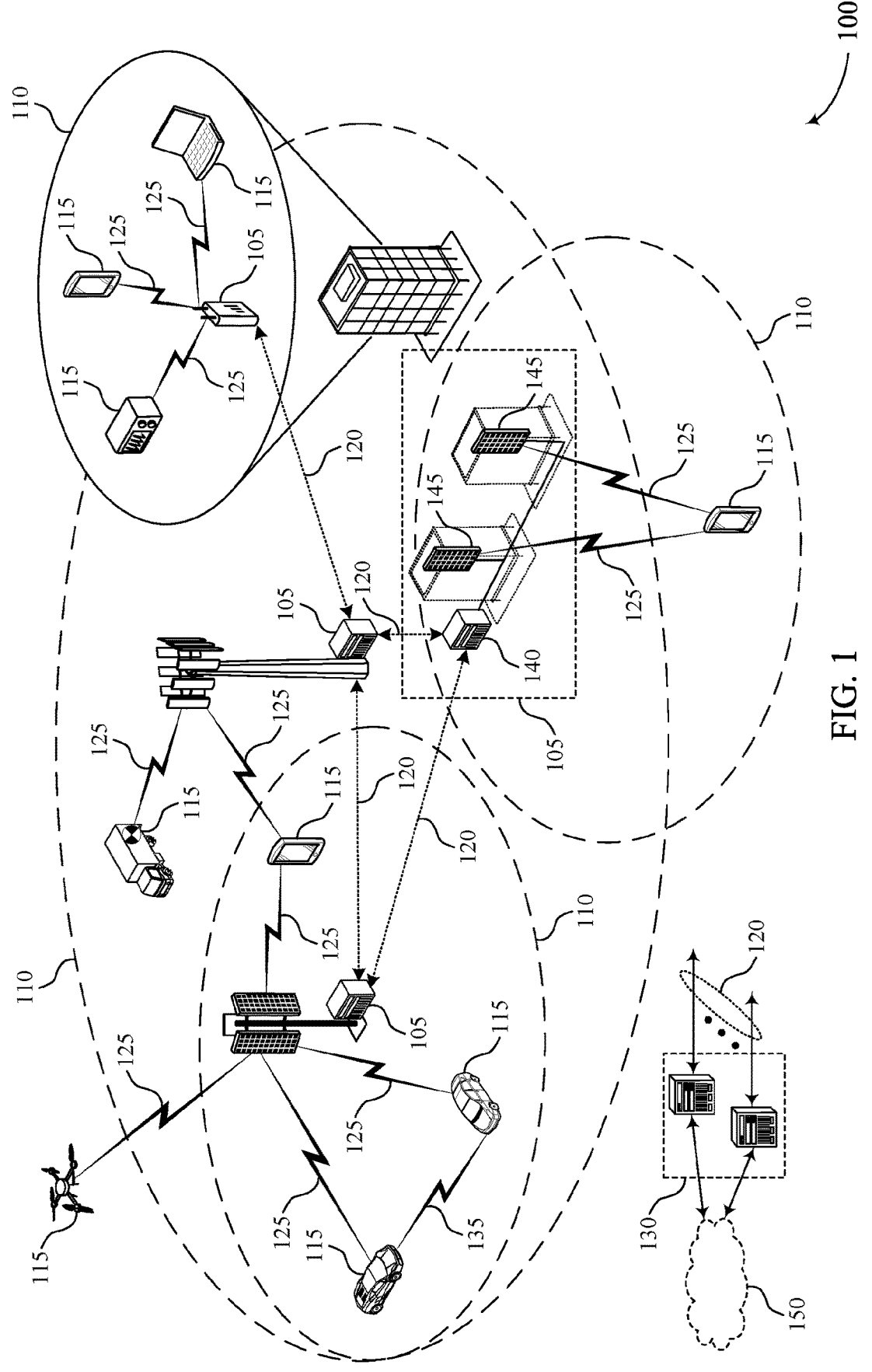
FIGS. 1 and 2 illustrates examples of wireless communications systems that support a method for protocol stack sharing in dual connectivity in accordance with aspects of the present disclosure.

In some cases, a user equipment (UE) may include multiple subscriber identity modules (SIMs) and may support MSIM operations. Each subscription or SIM may support data and voice communications or services using one or more radio access technologies (RATs). One or both subscriptions of the UE may support dual connectivity (DC) operations, which may support concurrent communications with multiple network entities associated with multiple cell groups. Each cell group may support the same or a different RAT. A UE may be configured as dual SIM, dual standby (DSDS), which may support communications using one SIM at a time. In some cases, a UE may be configured as a single receive (SR)-DSDS, which may support receiving signaling using only one RAT at a time. Alternatively, a UE may be configured as a dual receive (DR)-DSDS, which may support receiving signaling using two RATS concurrently. When the UE is configured with two SIMs and is operating in a SR-DSDS mode, the UE may periodically suspend signaling (e.g., active data communications) from the first subscription to monitor for signaling (e.g., idle-mode communications) from the second subscription, which may cause latency and reduced throughput associated with receiving messages from the first subscription.

If both subscriptions of an MSIM UE camp on a same cell with the same RAT, then the UE may use a protocol stack of one of the subscriptions to perform idle-mode activities of the other subscription. However, such techniques may be limited to cases where both subscriptions of the UE are configured for communications with a single RAT, and as such may not extend to scenarios where the UE is configured for dual connectivity with two different RAT protocol stacks.

As described herein, an MSIM UE configured with dual connectivity may use a protocol stack for a first subscription to receive idle-mode signaling, such as a paging message, for a second subscription. The UE may be configured with a first subscription that supports dual connectivity with a master cell group (MCG) and a secondary cell group (SCG). The MCG and the SCG may each support a same or different RAT, such as Long Term Evolution (LTE), New Radio (NR) or the like. The UE may also be configured with a second subscription that supports communications with a single RAT. The RAT supported by the second subscription may be the same as the RAT supported by the MCG of the first subscription, the SCG of the first subscription, or both. In some cases, the time-frequency resources allocated for receiving signaling (e.g., data communications) using the first subscription may overlap, at least partially, with the time-frequency resources allocated for receiving signaling (e.g., idle-mode messages) using the second subscription. In such cases, the UE may use the protocol stack associated with a RAT of the first subscription (e.g., the RAT supported by the MCG or the RAT supported by the SCG) to receive idle-mode signaling associated with the same RAT for the second subscription.

Aspects of the disclosure are initially described in the context of wireless communications systems. Aspects of the disclosure are further described in the context of a transmission timeline and a process flow. Aspects of the disclosure are further illustrated by and described with reference to apparatus diagrams, system diagrams, and flowcharts that relate to a method for protocol stack sharing in dual connectivity.

FIG. 1 illustrates an example of a wireless communications system 100 that supports a method for protocol stack sharing in dual connectivity in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples, (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., Nr) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets config-ured for sending control information to multiple UEs 115 and UE-specific search space sets for sending control infor-mation to a specific UE 115.

Each base station 105 may provide communication cov-erage via one or more cells, for example a macro cell, a small cell, a hot spot, or other types of cells, or any combination thereof. The term "cell" may refer to a logical communica-tion entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geo-graphic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an associa-tion with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic cov-erage areas 110 may be supported by the same base station 105. In other examples, the overlapping geographic cover-age areas 110 associated with different technologies may be supported by different base stations 105. The wireless com-munications system 100 may include, for example, a het-erogeneous network in which different types of the base stations 105 provide coverage for various geographic cov-erage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The tech-niques described herein may be used for either synchronous or asynchronous operations.

Some UEs 115, such as MTC or IoT devices, may be low cost or low complexity devices and may provide for auto-mated communication between machines (e.g., via Machine-to-Machine (M2M) communication). M2M com-munication or MTC may refer to data communication tech-nologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access con-trol, and transaction-based business charging.

Some UEs 115 may be configured to employ operating modes that reduce power consumption, such as half-duplex communications (e.g., a mode that supports one-way com-munication via transmission or reception, but not transmis-sion and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband commu-nications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be con-figured to support ultra-reliable communications or low-latency communications, or various combinations thereof. For example, the wireless communications system 100 may be configured to support ultra-reliable low-latency commu-nications (URLLC) or mission critical communications. The UEs 115 may be designed to support ultra-reliable, low-latency, or critical functions (e.g., mission critical func-tions). Ultra-reliable communications may include private communication or group communication and may be sup-ported by one or more mission critical services such as mission critical push-to-talk (MCPTT), mission critical video (MCVideo), or mission critical data (MCData). Sup-port for mission critical functions may include prioritization of services, and mission critical services may be used for public safety or general commercial applications. The terms ultra-reliable, low-latency, mission critical, and ultra-reli-able low-latency may be used interchangeably herein.

In some examples, a UE 115 may also be able to com-municate directly with other UEs 115 over a device-to-device (D2D) communication link 135 (e.g., using a peer-to-peer (P2P) or D2D protocol). One or more UEs 115 utilizing D2D communications may be within the geo-graphic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a trans-mitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjust-ments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming opera-tions for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Trans-missions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with trans-missions along a single beam direction may be determined based on a signal that was transmitted in one or more beam directions. For example, a UE 115 may receive one or more of the signals transmitted by the base station 105 in different directions and may report to the base station 105 an indi-cation of the signal that the UE 115 received with a highest signal quality or an otherwise acceptable signal quality.

In some examples, transmissions by a device (e.g., by a base station 105 or a UE 115) may be performed using multiple beam directions, and the device may use a combi-nation of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feed-back (e.g., a multi-panel type codebook, a linear combina-tion type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communi-cate over logical channels. A Medium Access Control (MAC) layer may perform priority handling and multiplex-ing of logical channels into transport channels. The MAC layer may also use error detection techniques, error correc-tion techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the like-lihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may support one or more RATs, such as LTE and NR in accordance with operating in a dual connectivity mode. The mode may allow the UE 115 to simultaneously transmit information, receive information, or both (e.g., in the form of data or control information packets) on multiple component carriers from at least two cell groups via a master cell group (MCG) corresponding to a master base station and a secondary cell group (SCG) corresponding to a secondary base station. In some cases, the UE may be configured with multiple subscriptions, such as a first subscription and a second subscription. The first subscription may support dual connectivity (e.g., with an MCG and an SCG), while the second subscription may support communications with a single RAT.

In some examples, the first subscription, the second subscription, or both may be in an idle state. The UE 115 may receive information from one or more cell groups for the first subscription (e.g., from the MCG or SCG) and the second subscription concurrently. In some cases, the UE 115 may operate in a single receive mode in which the UE 115 suspends receiving information from the one or more cell groups of the first subscription to monitor a channel for information from a cell, or a cell group, of the second subscription. However, suspending reception of transmissions from the cell groups of the first subscription may cause signaling latency in wireless communications system 100.

In some examples, a UE 115 may be configured with multiple subscriptions (e.g., two subscriptions) in an MSIM configuration and may communicate idle-mode signaling with one or more cell groups for the subscriptions using a common protocol stack between RATs supported by the subscriptions. In some cases, each cell group may support a RAT and each RAT, such as LTE or NR, may support a different protocol stack. When the UE 115 receives transmissions from one or more cell groups of the first subscription in a dual connectivity mode (e.g., an MCG operating according to a first RAT and an SCG operating according to a second RAT) and transmissions from one or more cells in a cell group of the second subscription (e.g., one or more cells operating according to a single RAT), the single RAT and one or both of the RATs for the dual connectivity mode may overlap. That is, one of the RATs supported by a cell group from the first subscription may be the same as the RAT supported by one or more cells from the second subscription. Thus, the UE 115 may use the protocol stack for the RAT supported by the cell group from the first subscription to receive idle-mode signaling, such as one or more paging messages, from the cells from the second subscription. In some cases, the UE 115 may process the idle mode signaling using overlapping time-frequency resources and the protocol stack of the MCG or the SCG from the first subscription.

Figure 2:
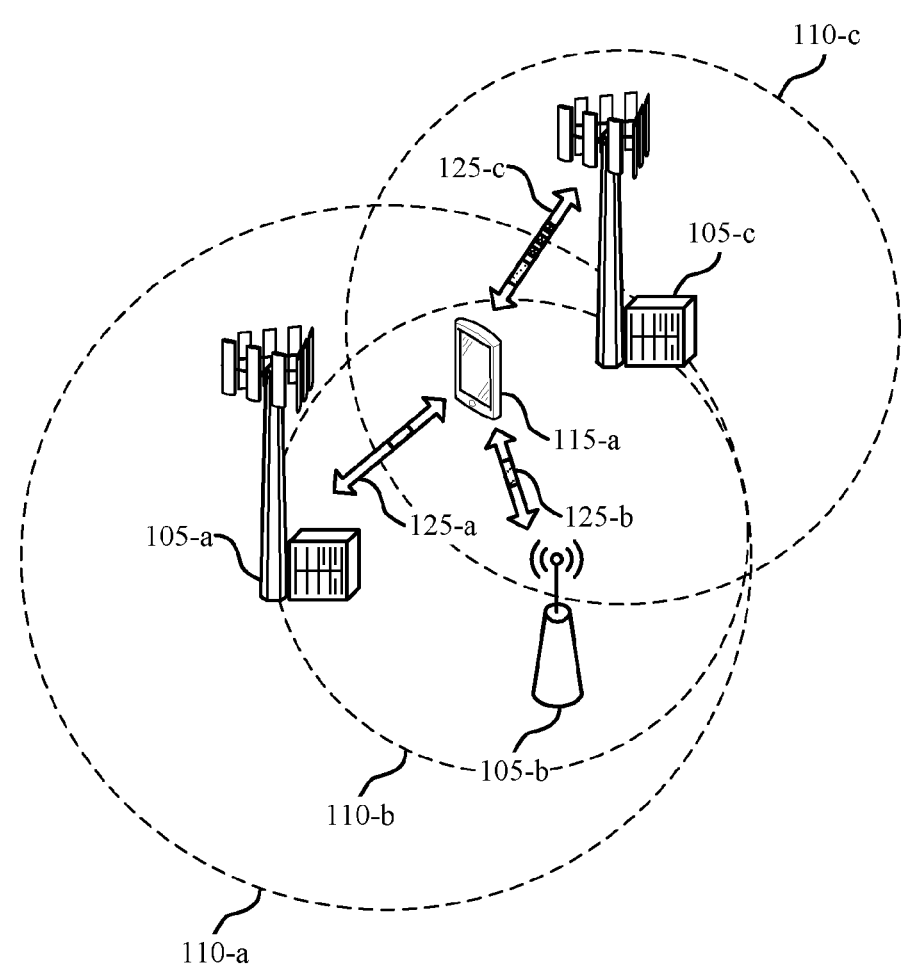
Figure 2:
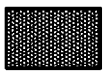
Figure 2:
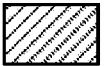
Figure 2:
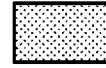
Figure 2:
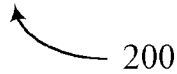

FIG. 2 illustrates an example of a wireless communications system 200 that supports a method for protocol stack sharing in dual connectivity in accordance with aspects of the present disclosure. In some examples, wireless communications system 200 may implement aspects of wireless communications system 100 and may include UE 115-a, communication link 125-a through communication link 125-c, and base station 105-a through base station 105-c with coverage area 110-a through coverage area 110-c, which may be examples of a UE 115, communication links 125, and base stations 105 with coverage areas 110 as described with reference to FIG. 1. In some examples, UE 115-a may be configured with, or otherwise support, MSIM operations in which UE 115-a may use a protocol stack for a RAT supported by one or more cell groups of a first subscription to receive idle-mode signaling 205 from a cell of a second subscription that supports the same RAT. In some examples, the wireless communications system 200 may support multiple radio access technologies including 4G systems such as LTE systems, LTE-A systems, or LTE-A Pro systems, and 5G systems which may be referred to as NR systems.

In some cases, a UE 115 may support one or more of the above example RATs for a subscription, such as LTE and NR in accordance with operating in a dual connectivity mode. The mode may allow UE 115-a to simultaneously transmit information, receive information, or both (e.g., in the form of data or control information packets) on multiple component carriers from at least two cell groups via a master cell group (MCG) corresponding to a master base station (e.g., a master eNB (MeNB), a master gNB (MgNB)) and a secondary cell group (SCG) corresponding to a secondary base station (e.g., a secondary eNB (SeNB), a secondary gNB (SgNB)). For example, the base station 105-a may be referred to as the master base station, while the base station 105-b may be referred to as the secondary base station. In some examples, the base station 105-a may correspond to the MCG that includes the primary cell, which may correspond to the coverage area 110-a, while the base station 105-b may correspond to the SCG that includes the secondary cell, which may correspond to the coverage area 110-b. In some examples, the SCG may include a primary secondary cell, as well as one or more additional secondary cells.

In some cases, the UE 115 may support a single RAT for a subscription (e.g., when not operating in a dual connectivity mode). For example, UE 115-a may transmit or receive information on a component carrier from one or more cells (e.g., in a cell group) via base station 105-c. In some cases, the UE 115 may support a first subscription that operates according to the dual connectivity mode and a second subscription that does not operate according to the dual connectivity mode.

In some cases, one or more cells may be standalone cells or non-standalone cells. Standalone cells may be associated with a base station 105, such as base station 105-c, and may rely on infrastructure from a single RAT, such as LTE or NR. Non-standalone cells may be associated with more than one base station 105, such as base station 105-b and base station 105-a and may rely on infrastructure from more than one RAT, such as LTE and NR. For example, if cells associated with base station 105-a support NR in a non-standalone scenario, the cells may rely on infrastructure from base station 105-b, which may support a different RAT, such as LTE.

In some examples, one or more cells or cell groups of the first subscription, the second subscription, or both may be operating in an idle state. The UE 115 may receive information from one or more cell groups of the first subscription (e.g., from the MCG or SCG) and one or more cells of the second subscription concurrently. In some cases, such as when the UE 115 is operating in a single receive mode, the UE 115 may suspend receiving information from the cell groups of the first subscription to monitor a channel for information from a cell of the second subscription. However, suspending reception of transmissions from the cell groups from the first subscription may cause signaling latency in wireless communications system 200.

In some examples, a UE 115 may be configured with multiple subscriptions (e.g., two subscriptions) in an MSIM configuration and may communicate idle-mode signaling 205 using a common protocol stack between the subscriptions. For example, base station 105-*a*, base station 105-*b*, or both may transmit subscription configuration 210-*a* to UE 115-*a* via communication link 125-*a*, communication link 125-*b*, or both, respectively. In some cases, subscription configuration 210-*a* may support a dual connectivity mode. Additionally or alternatively, base station 105-*c* may transmit subscription configuration 210-*b* to UE 115-*a* via communication link 125-*c*. In some cases, subscription configuration 210-*b* may not support the dual connectivity mode.

In some cases, as shown in Table A, UE 115-*a* may support one or more dual connectivity options for the dual connectivity mode based on subscription configuration 210-*a*. For example, UE 115-*a* may support an Evolved Universal Mobile Telecommunications Service (UMTS) Terrestrial Radio Access Network (E-UTRAN) New Radio-Dual Connectivity (EN-DC) option or a next-generation radio access network-Dual Connectivity (NGEN-DC) option in which the MCG operates according to an LTE system and the SCG operates according to an NR system. Additionally or alternatively, UE 115-*a* may support a New Radio E-UTRAN-Dual Connectivity (NE-DC) option in which the MCG operates according to an NR system and the SCG operates according to an LTE system. In some examples, UE 115-*a* may support a New Radio-Dual Connectivity (NR-DC) option in which the MCG and the SCG operate according to an NR system.

Additionally or alternatively, UE 115-*a* may support an EN-DC or NGEN-DC option, an NE-DC option, an NR-DC option, or a combination based on subscription configuration 210-*b*. For example, one or more cells associated with base station 105-*c* may operate according to NR or LTE for the EN-DC or NGEN-DC option, NR or LTE for the NE-DC option, or NR for the NR-DC option.

TABLE A

| Dual connectivity in MSIM operation | | | |
| --- | --- | --- | --- |
| Dual Connectivity Option | First Subscription | | Second Subscription |
| | MCG | SCG | |
| EN-DC/NGEN-DC | LTE | NR | LTE or NR |
| NE-DC | NR | LTE | LTE or NR |
| NR-DC | NR | NR | NR |

In some cases, each RAT, such as LTE or NR, may support a different protocol stack. However, when UE 115-*a* receives subscription configuration 210-*a* with the dual connectivity mode (e.g., an MCG operating according to a first RAT and an SCG operating according to a second RAT, as shown in Table A) and subscription configuration 210-*b* (e.g., one or more cells operating according to a single RAT), one or both of the RATs for the dual connectivity mode supported by a first subscription corresponding to subscription configuration 210-*a* and the single RAT supported by a second subscription corresponding to subscription configuration 210-*b* and may overlap. That is, one of the RATs for a cell group of the first subscription may be the same as the RAT for one or more cells of the second subscription. Thus, UE 115-*a* may use the protocol stack for the RAT from the cell groups of the first subscription to receive one or more idle-mode transmissions from the cells of the second subscription.

In some cases, one or more time-frequency resources may overlap for signaling from one or more cell groups of the first subscription (e.g., based on subscription configuration 210-*a*) and signaling from one or more cells of the second subscription (e.g., based on subscription configuration 210-*b*), which may include paging messages in an idle-mode. For example, UE 115-*a* may receive one or more parameters from an MCG, an SCG, or both of the first subscription and one or more parameters from a cell of the second subscription. The parameters may include a frequency bandwidth, a cell identifier, a public land mobile network (PLMN) identifier, a master information block (MIB), a system information block (SIB), or a combination. UE 115-*a* may determine the one or more time-frequency resource overlap based on one or more of the parameters overlapping.

In some cases, the first subscription and the second subscription may correspond to the same operator. That is, base station 105-*b*, which may correspond to the SCG, may be the base station 105 for the second subscription. Thus, if the first subscription is operating in a connected mode, UE 115-*a* may receive idle-mode signaling 205 from one or more cells of the second subscription using the protocol stack of a RAT supported by the first subscription.

In some examples, the first subscription and the second subscription may be associated with different operators. However, one or more cells of the second subscription may roam to a cell in the SCG or the MCG of the first subscription. Thus, UE 115-*a* may receive idle-mode signaling 205 from the one or more cells of the second subscription using the protocol stack of a RAT supported by the SCG or the MCG based on the roaming. Additionally or alternatively, a cell group associated with base station 105-*a*, such as an MCG, may include a radio access network (RAN) sharing cell between two different operators. Another cell group associated with base station 105-*b*, such as an SCG, may support additional cells of the second subscription. Thus, UE 115-*a* may use the protocol stack of a RAT supported by the SCG.

In some cases, UE 115-*a* may be in an RRC connected state and may determine that the RAT supported by the second subscription is the same as the RAT supported by the MCG of the first subscription or the RAT supported by the SCG of the first subscription. In some other cases, UE 115-*a* may be in an RRC idle state and may determine that the RAT supported by the one or more cells from the second subscription is the same as a RAT associated with the MCG of the first subscription. In some examples, the cells from base station 105-*c* may have the same tracking area. UE 115-*a* may receive the idle-mode signaling 205 from one of the cells of base station 105-*c*.

In some cases, UE 115-*a* may process the idle mode signaling 205 from the second subscription using the overlapping time-frequency resources and the protocol stack of the RAT supported by the MCG or the SCG of the first subscription.

Figure 3:
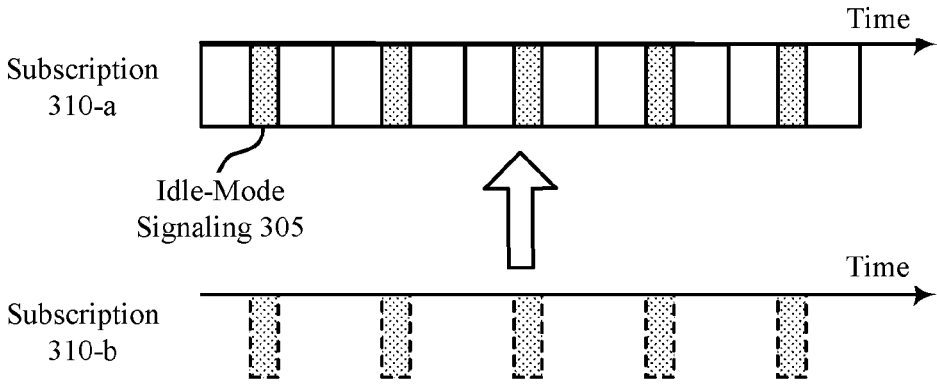
FIG. 3 illustrates an example of a transmission timeline that supports a method for protocol stack sharing in dual connectivity in accordance with aspects of the present disclosure.

FIG. 3 illustrates an example of a transmission timeline 300 that supports a method for protocol stack sharing in dual connectivity in accordance with aspects of the present disclosure. In some examples, transmission timeline 300 may implement aspects of wireless communications system 100, wireless communications system 200, or both. Aspects of transmission timeline 300 may be implemented by a UE 115, one or more base stations 105, or both, as described with reference to FIGS. 1 and 2. For example, transmission timeline 300 may illustrate a process for a UE 115 to use a protocol stack for a RAT supported by one or more cell groups of a first subscription to receive idle-mode signaling 305 from a cell of a second subscription that supports the same RAT.

In some cases, a UE 115 may be configured with subscription 310-*a*, which may be a dual connectivity subscription, and subscription 310-*b*, which may not be a dual connectivity subscription. In some examples, subscription 310-*a*, subscription 310-*b*, or both may be examples of single receive subscriptions (e.g., single receive-dual-SIM dual-standby (SR-DSDS) subscriptions) in which the UE 115 may receive signaling from one subscription at a time (e.g., idle-mode signaling 305 if one or more of the subscriptions are in a standby mode). In some cases, the UE 115 may receive signaling from one or more cell groups of subscription 310-*a* and signaling from one or more cells of subscription 310-*b* concurrently. However, if subscription 310-*a*, subscription 310-*b*, or both are single receive subscriptions, the UE 115 may suspend, or pause, receiving the signaling from the one or more cell groups from subscription 310-*a* to monitor for the signaling from the one or more cells from subscription 310-*b*, which may increase latency related to communications with the one or more cell groups.

In some cases, a base station 105 in communication with one or more cell groups of subscription 310-*a* and one or more cells of subscription 310-*b* may use the same time-frequency resources (e.g., over the air time-frequency resources). In some cases, such as when the UE 115 is in an RRC connected state, the UE 115 may receive idle-mode signaling 305 from one or more cells of subscription 310-*b* based on a protocol stack for a RAT supported by subscription 310-*a*. For example, UE 115 may receive a cell common configuration, such as a MIB or a SIB (e.g., a SIB Type 1 (SIB1)), one or more paging messages, or both for subscription 310-*b* using subscription 310-*a* based on the protocol stack of a RAT supported by one or more cell groups of subscription 310-*a* (e.g., an MCG, an SCG, or both) being the same as a RAT supported by the one or more cells of subscription 310-*b*. In some other cases, such as when the UE 115 is in an RRC idle state, the UE 115 may receive idle mode signaling 305 based on a protocol stack from an MCG of subscription 310-*a* if the MCG supports the same RAT as the one or more cells from subscription 310-*b*.

In some cases, if a current SCG of subscription 310-*a* supports a RAT that is also supported by one or more cells of subscription 310-*b*, the UE 115 may use the protocol stack from the RAT supported by the SCG of subscription 310-*a* to process idle-mode signaling from one or more cells of subscription 310-*b* during time-frequency resources, which may save power at the UE 115.

Figure 4:
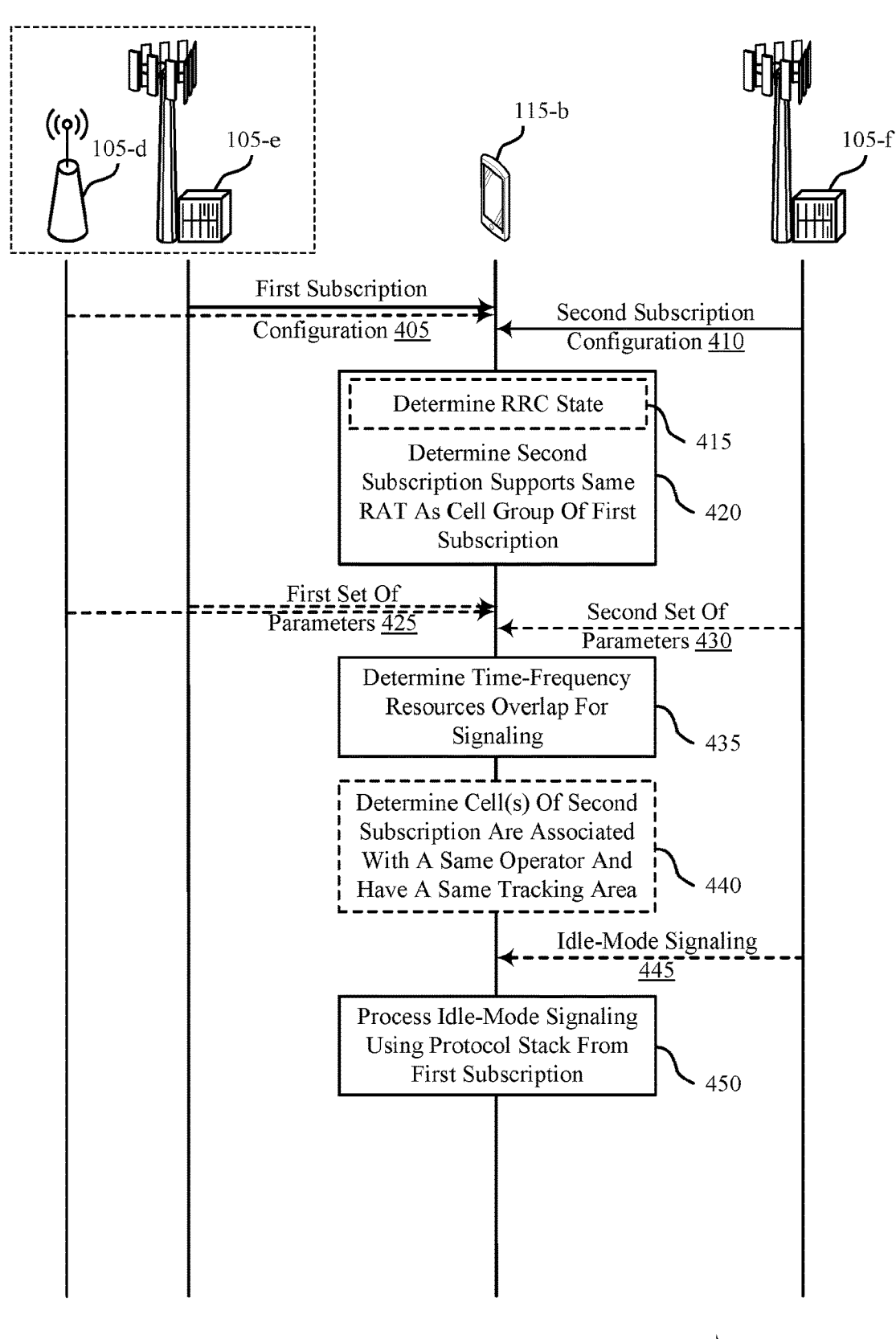
FIG. 4 illustrates an example of a process flow that supports a method for protocol stack sharing in dual connectivity in accordance with aspects of the present disclosure.

FIG. 4 illustrates an example of a process flow 400 that supports a method for protocol stack sharing in dual connectivity in accordance with aspects of the present disclosure. In some examples, process flow 400 may implement aspects of wireless communications system 100, wireless communications system 200, or both as well as transmission timeline 300. The process flow 400 may illustrate an example of a UE 115, such as UE 115-*b*, or base stations 105, such as base station 105-*d*, base station 105-*e*, or base station 105-*f*, to communicate idle-mode signaling from one or more cells of a second subscription based on a protocol stack for a RAT supported by a cell group of a first subscription, where the one or more cells of the second subscription supports the same RAT. Alternative examples of the following may be implemented, where some processes are performed in a different order than described or are not performed. In some cases, processes may include additional features not mentioned below, or further processes may be added.

At 405, UE 115-*b* may receive configuration signaling that configures a first subscription of UE 115-*b* and a second subscription of UE 115-*b*. In some cases, UE 115-*b* may receive the configuration signaling from one or more cells of one or more base stations 105. For example, UE 115-*b* may receive a first subscription configuration at 405 from base station 105-*d*, base station 105-*e*, or both. The first subscription may support dual connectivity with a first cell group (e.g., an MCG) that supports a first RAT (e.g., LTE or NR) and a second cell group (e.g., an SCG) that supports a second RAT (e.g., LTE or NR). The first cell group may be from base station 105-*e* and the second cell group may be from base station 105-*d*. In some cases, UE 115-*b* may receive a second subscription configuration at 410 from base station 105-*f*. In some cases, the second subscription may support communication with a cell from base station 105-*f* that supports the first RAT, the second RAT, or both.

At 415, UE 115-*b* may determine that UE 115-*b* is in an RRC state. For example, UE 115-*b* may determine UE 115-*b* is in an RRC connected state. In some other examples, UE 115-*b* may determine UE 115-*b* is in an RRC idle state.

At 420, UE 115-*b* may determine the second subscription supports a same RAT as the first subscription. For example, UE 115-*b* may determine the RAT supported by the second subscription is the same as a RAT associated with an MCG of the first subscription or a RAT associated with the SCG of the first subscription based on UE 115-*b* being in an RRC connected state. In some other examples, UE 115-*b* may determine the RAT supported by the second subscription is the same as a RAT associated with the MCG of the first subscription based on UE 115-*b* being in an RRC idle state. In some cases, one or more cells in the first cell group or the second cell group from the first subscription and the cell from the second subscription may correspond to the same operator. In some other cases, one or more cells in the first cell group or the second cell group from the first subscription and the cell from the second subscription may correspond to different operators. UE 115-*b* may determine the one or more cells in the first cell group or the second cell group from the first subscription and the cell from the second subscription correspond to the same base station 105.

At 425, UE 115-*b* may receive a first set of parameters from a cell in the first cell group or the second cell group from the first subscription. At 430, UE 115-*b* may receive a second set of parameters from the cell from the second subscription. In some cases, the one or more parameters may include a frequency bandwidth, a cell identifier, PLMN identifier, an MIB, a SIB (e.g., a SIB1), or a combination.

At 435, UE 115-*b* may determine that first time-frequency resources corresponding to first signaling with the first subscription at least partially overlap with second time-frequency resources corresponding to idle-mode signaling (e.g., one or more paging messages) associated with the second subscription. In some cases, UE 115-*b* may determine the time-frequency resources at least partially overlap based on the first set of one or more parameters at least partially overlapping with the second set of one or more parameters.

At 440, UE 115-*b* may determine one or more cells of the first subscription have a same operator and a same tracking area. At 445, UE 115-*b* may receive the idle-mode signaling from a cell of the one or more cells of the second subscription.

At 450, UE 115-*b* may process the idle-mode signaling for the second subscription using a protocol stack from a cell group of the first subscription. In some cases, UE 115-*b* may process the idle-mode signaling during the first time-frequency resources. In some cases, UE 115-*b* may receive the idle-mode signaling based on the cell from the second subscription roaming from a first operator to a second operator, where one or more cells in the first cell group or the second cell group from the first subscription are associated with the operator. In some cases, the second subscription may have an additional protocol stack (e.g., for a RAT) that may be the same as the protocol stack from a cell group of the first operator.

Figure 5:
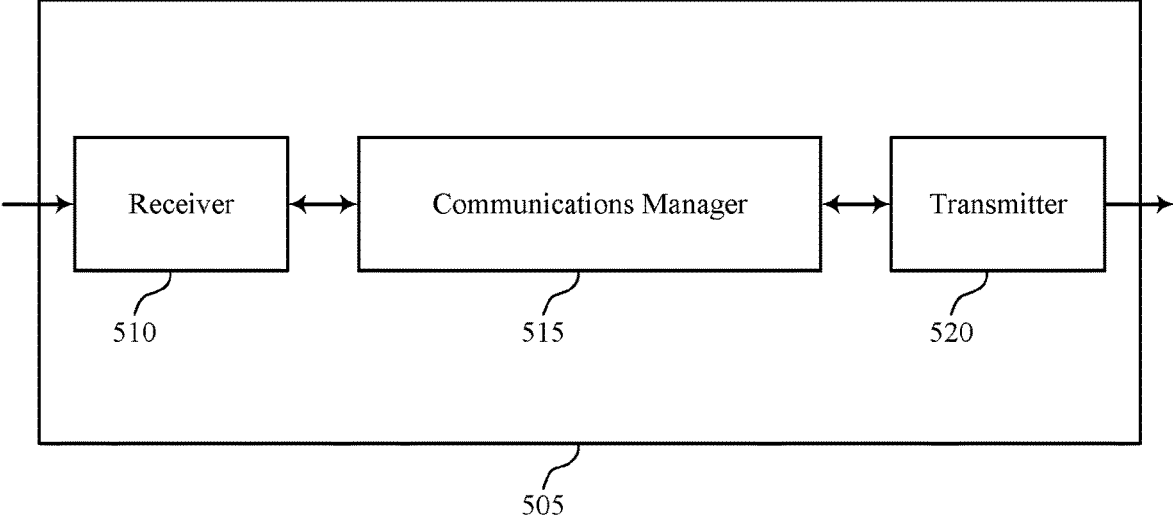
FIGS. 5 and 6 show block diagrams of devices that support a method for protocol stack sharing in dual connectivity in accordance with aspects of the present disclosure.

FIG. 5 shows a block diagram 500 of a device 505 that supports a method for protocol stack sharing in dual connectivity in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to a method for protocol stack sharing in dual connectivity, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both, determine that the second subscription supports a same RAT as the first subscription and that first time-frequency resources corresponding to first signaling with the first subscription at least partially overlaps with second time-frequency resources corresponding to idle-mode signaling associated with the second subscription, and process, during the first time-frequency resources and using a protocol stack associated with the first subscription, the idle-mode signaling associated with the second subscription based on the determining. The communications manager 515 may be an example of aspects of the communications manager 810 described herein.

The actions performed by the communications manager 515 as described herein may be implemented to realize one or more potential advantages. One implementation may enable a UE to be configured with two subscriptions and use a protocol stack from a RAT supported by the first subscription to process idle-mode signaling from the second subscription. Using the protocol stack associated with the first subscription may enable the UE to simultaneously receive signaling from one or more cell groups of the first subscription and one or more cells of the second subscription, which may improve communication latency (e.g., related to suspending monitoring of the signaling from the one or more cell groups of the first subscription), among other advantages.

Based on implementing the same protocol stack between subscriptions as described herein, a processor of a UE or a base station (e.g., a processor controlling the receiver 510, the communications manager 515, the transmitter 520, or a combination thereof) may reduce the impact or likelihood of inefficient resource utilization due to a dual connectivity operations while ensuring relatively efficient communications. For example, the idle-mode signal processing techniques described herein may leverage a same RAT for a cell group of the first subscription and a cell of the second subscription to determine a common protocol stack, which may realize power savings at the UE (e.g., due to reusing the protocol stack from the first subscription), among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programable gate-array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
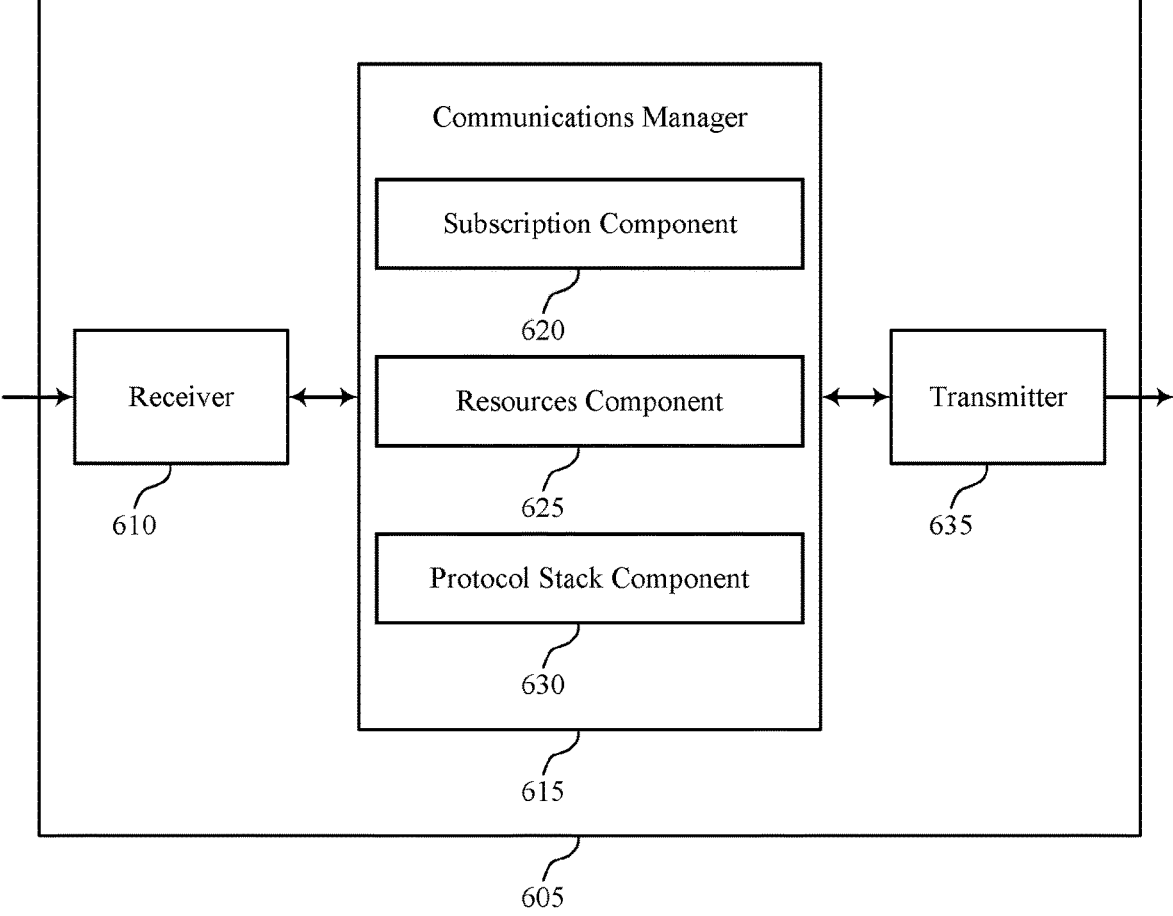

FIG. 6 shows a block diagram 600 of a device 605 that supports a method for protocol stack sharing in dual connectivity in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to a method for protocol stack sharing in dual connectivity, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a subscription component 620, a resources component 625, and a protocol stack component 630. The communications manager 615 may be an example of aspects of the communications manager 810 described herein.

The subscription component 620 may receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both.

The resources component 625 may determine that the second subscription supports a same RAT as the first subscription and that first time-frequency resources corresponding to first signaling with the first subscription at least partially overlaps with second time-frequency resources corresponding to idle-mode signaling associated with the second subscription.

The protocol stack component 630 may process, during the first time-frequency resources and using a protocol stack associated with the first subscription, the idle-mode signaling associated with the second subscription based on the determining.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
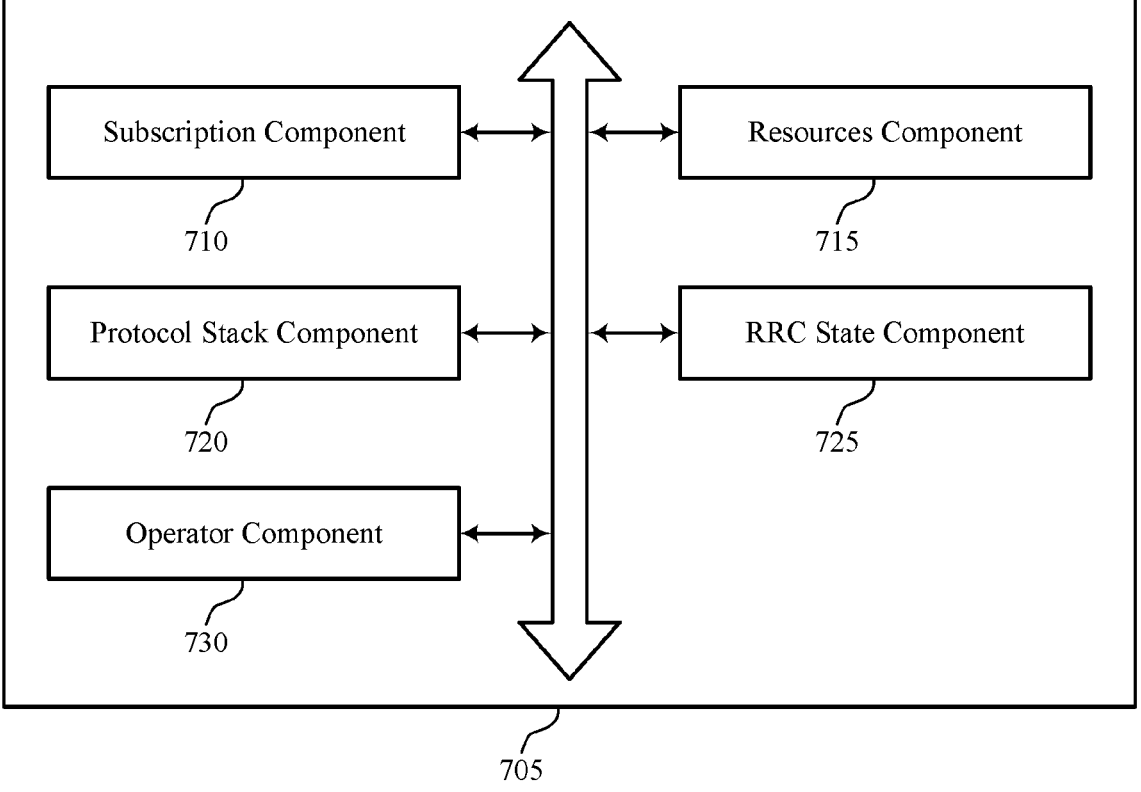
FIG. 7 shows a block diagram of a communications manager that supports a method for protocol stack sharing in dual connectivity in accordance with aspects of the present disclosure.

FIG. 7 shows a block diagram 700 of a communications manager 705 that supports a method for protocol stack sharing in dual connectivity in accordance with aspects of the present disclosure. The communications manager 705 may be an example of aspects of a communications manager 515, a communications manager 615, or a communications manager 810 described herein. The communications manager 705 may include a subscription component 710, a resources component 715, a protocol stack component 720, an RRC state component 725, and an operator component 730. Each of these modules may communicate, directly or indirectly, with one another (e.g., via one or more buses).

The subscription component 710 may receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both.

In some examples, the subscription component 710 may determine the one or more cells in the first cell group or the second cell group associated with the first subscription and the cell associated with the second subscription correspond to a same base station. In some cases, the first RAT is Long Term Evolution or New Radio, the second RAT is Long Term Evolution or New Radio, or a combination thereof.

The resources component 715 may determine that the second subscription supports a same RAT as the first subscription and that first time-frequency resources corresponding to first signaling with the first subscription at least partially overlaps with second time-frequency resources corresponding to idle-mode signaling associated with the second subscription. In some examples, the resources component 715 may receive an indication of a first set of one or more parameters from a cell in the first cell group or the second cell group associated with the first subscription and a second set of one or more parameters from the cell associated with the second subscription. In some examples, the resources component 715 may determine the first set of one or more parameters at least partially overlaps with the second set of one or more parameters. In some cases, the first set of one or more parameters and the second set of one or more parameters include a frequency bandwidth, a cell identifier, a PLMN identifier, an MIB, a SIB, or a combination.

The protocol stack component 720 may process, during the first time-frequency resources and using a protocol stack associated with the first subscription, the idle-mode signaling associated with the second subscription based on the determining. In some examples, the protocol stack component 720 may use the protocol stack associated with the first subscription based on the additional protocol stack and the protocol stack being the same.

The RRC state component 725 may determine that the UE is in an RRC connected state. In some examples, the RRC state component 725 may determine that a RAT supported by the second subscription is the same as a RAT associated with a master cell group of the first subscription or a RAT associated with a secondary cell group of the first subscription based on determining that the UE is in the RRC connected state.

In some examples, the RRC state component 725 may determine that the UE is in an RRC idle state. In some examples, the RRC state component 725 may determine that a RAT supported by the second subscription is the same as a RAT associated with a master cell group of the first subscription based on determining that the UE is in the RRC idle state.

The operator component 730 may determine that the cell and one or more additional cells associated with the second subscription are associated with a same operator and have a same tracking area. In some examples, the operator component 730 may receive the idle-mode signaling from the cell associated with the second subscription.

In some examples, the operator component 730 may receive the idle-mode signaling associated with the second subscription based on the cell associated with the second subscription roaming from a first operator to a second operator, where one or more cells in the first cell group or the second cell group associated with the first subscription are associated with the second operator. In some cases, one or more cells in the first cell group or the second cell group associated with the first subscription and the cell associated with the second subscription correspond to a same operator.

Figure 8:
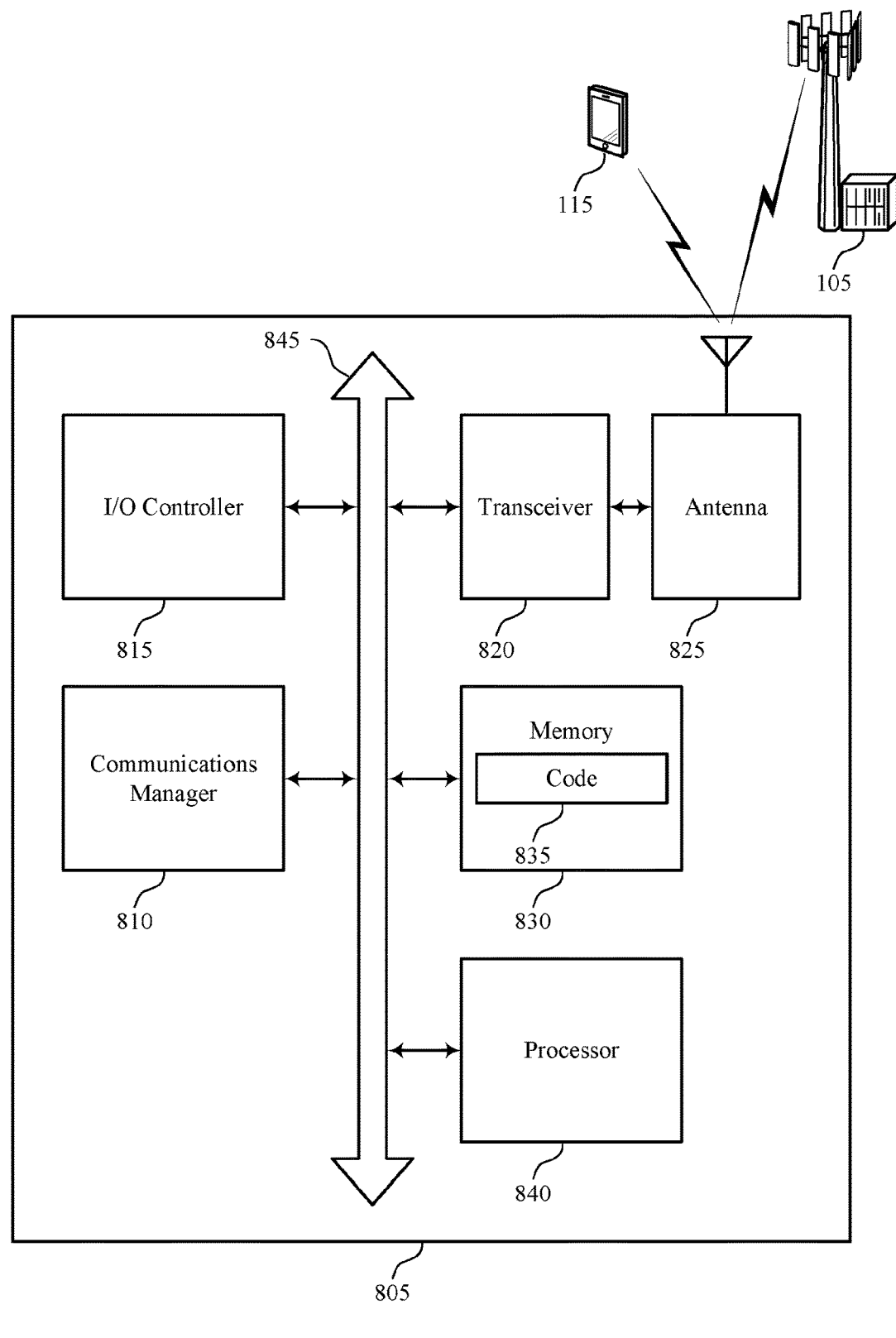
FIG. 8 shows a diagram of a system including a device that supports a method for protocol stack sharing in dual connectivity in accordance with aspects of the present disclosure.

FIG. 8 shows a diagram of a system 800 including a device 805 that supports a method for protocol stack sharing in dual connectivity in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both, determine that the second subscription supports a same RAT as the first subscription and that first time-frequency resources corresponding to first signaling with the first subscription at least partially overlaps with second time-frequency resources corresponding to idle-mode signaling associated with the second subscription, and process, during the first time-frequency resources and using a protocol stack associated with the first subscription, the idle-mode signaling associated with the second subscription based on the determining.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting a method for protocol stack sharing in dual connectivity).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

FIG. 9 shows a flowchart illustrating a method 900 that supports a method for protocol stack sharing in dual connectivity in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both. The operations of 905 may be performed according to the methods described herein. In some examples, aspects of the operations of 905 may be performed by a subscription component as described with reference to FIGS. 5 through 8.

At 910, the UE may determine that the second subscription supports a same RAT as the first subscription and that first time-frequency resources corresponding to first signaling with the first subscription at least partially overlaps with second time-frequency resources corresponding to idle-mode signaling associated with the second subscription. The operations of 910 may be performed according to the methods described herein. In some examples, aspects of the operations of 910 may be performed by a resources component as described with reference to FIGS. 5 through 8.

At 915, the UE may process, during the first time-frequency resources and using a protocol stack associated with the first subscription, the idle-mode signaling associated with the second subscription based on the determining. The operations of 915 may be performed according to the methods described herein. In some examples, aspects of the operations of 915 may be performed by a protocol stack component as described with reference to FIGS. 5 through 8.

FIG. 10 shows a flowchart illustrating a method 1000 that supports a method for protocol stack sharing in dual connectivity in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both. The operations of 1005 may be performed according to the methods described herein. In some examples, aspects of the operations of 1005 may be performed by a subscription component as described with reference to FIGS. 5 through 8.

At 1010, the UE may determine that the UE is in an RRC connected state. The operations of 1010 may be performed according to the methods described herein. In some examples, aspects of the operations of 1010 may be performed by an RRC state component as described with reference to FIGS. 5 through 8.

At 1015, the UE may determine that a RAT supported by the second subscription is the same as a RAT associated with a master cell group of the first subscription or a RAT associated with a secondary cell group of the first subscription based on determining that the UE is in the RRC connected state. The operations of 1015 may be performed according to the methods described herein. In some examples, aspects of the operations of 1015 may be performed by an RRC state component as described with reference to FIGS. 5 through 8.

At 1020, the UE may determine that the second subscription supports a same RAT as the first subscription and that first time-frequency resources corresponding to first signaling with the first subscription at least partially overlaps with second time-frequency resources corresponding to idle-mode signaling associated with the second subscription. The operations of 1020 may be performed according to the methods described herein. In some examples, aspects of the operations of 1020 may be performed by a resources component as described with reference to FIGS. 5 through 8.

At 1025, the UE may process, during the first time-frequency resources and using a protocol stack associated with the first subscription, the idle-mode signaling associated with the second subscription based on the determining. The operations of 1025 may be performed according to the methods described herein. In some examples, aspects of the operations of 1025 may be performed by a protocol stack component as described with reference to FIGS. 5 through 8.

FIG. 11 shows a flowchart illustrating a method 1100 that supports a method for protocol stack sharing in dual connectivity in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive configuration signaling that configures a first subscription of the UE and a second subscription of the UE, where the first subscription supports dual connectivity with a first cell group associated with a first RAT and a second cell group associated with a second RAT, and where the second subscription supports communications with a cell associated with the first RAT, the second RAT, or both. The operations of 1105 may be performed according to the methods described herein. In some examples, aspects of the operations of 1105 may be performed by a subscription component as described with reference to FIGS. 5 through 8.

At 1110, the UE may determine that the UE is in an RRC idle state. The operations of 1110 may be performed according to the methods described herein. In some examples, aspects of the operations of 1110 may be performed by an RRC state component as described with reference to FIGS. 5 through 8.

At 1115, the UE may determine that a RAT supported by the second subscription is the same as a RAT associated with a master cell group of the first subscription based on determining that the UE is in the RRC idle state. The operations of 1115 may be performed according to the methods described herein. In some examples, aspects of the operations of 1115 may be performed by an RRC state component as described with reference to FIGS. 5 through 8.

At 1120, the UE may determine that the second subscription supports a same RAT as the first subscription and that first time-frequency resources corresponding to first signaling with the first subscription at least partially overlaps with second time-frequency resources corresponding to idle-mode signaling associated with the second subscription. The operations of 1120 may be performed according to the methods described herein. In some examples, aspects of the operations of 1120 may be performed by a resources component as described with reference to FIGS. 5 through 8.

At 1125, the UE may process, during the first time-frequency resources and using a protocol stack associated with the first subscription, the idle-mode signaling associated with the second subscription based on the determining. The operations of 1125 may be performed according to the methods described herein. In some examples, aspects of the operations of 1125 may be performed by a protocol stack component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

receiving configuration signaling that configures a first subscription of the UE and a second subscription of the UE, wherein the first subscription supports dual connectivity with a first cell group associated with a first radio access technology and a second cell group associated with a second radio access technology, and wherein the second subscription supports communications with a cell associated with the first radio access technology, the second radio access technology, or both;

determining that the second subscription supports a same radio access technology as the first subscription and that first time-frequency resources corresponding to first signaling with the first subscription at least partially overlaps with second time-frequency resources corresponding to idle-mode signaling associated with the second subscription, wherein the second subscription is associated with a first protocol stack; and processing, during the first time-frequency resources and using a second protocol stack associated with the first subscription based at least in part on the first protocol stack and the second protocol stack being the same, the idle-mode signaling associated with the second subscription based at least in part on the determining.

2. The method of claim 1, wherein determining that the second subscription supports the same radio access technology as the first subscription comprises:

determining that the UE is in a radio resource control connected state; and determining that a radio access technology supported by the second subscription is the same as a radio access technology associated with a master cell group of the first subscription or a radio access technology associated with a secondary cell group of the first subscription based at least in part on determining that the UE is in the radio resource control connected state.

3. The method of claim 1, wherein determining that the second subscription supports the same radio access technology as the first subscription comprises:

determining that the UE is in a radio resource control idle state; and determining that a radio access technology supported by the second subscription is the same as a radio access technology associated with a master cell group of the first subscription based at least in part on determining that the UE is in the radio resource control idle state.

4. The method of claim 1, wherein processing the idle-mode signaling comprises:

determining that the cell and one or more additional cells associated with the second subscription are associated with a same operator and have a same tracking area; and receiving the idle-mode signaling from the cell associated with the second subscription.

5. The method of claim 1, wherein determining that the first time-frequency resources corresponding to the first signaling at least partially overlaps with the second time-frequency resources corresponding to the idle-mode signaling comprises:

receiving an indication of a first set of one or more parameters from a cell in the first cell group or the second cell group associated with the first subscription and a second set of one or more parameters from the cell associated with the second subscription; and determining the first set of one or more parameters at least partially overlaps with the second set of one or more parameters.

6. The method of claim 5, wherein the first set of one or more parameters and the second set of one or more parameters comprise a frequency bandwidth, a cell identifier, a public land mobile network identifier, a master information block, a system information block, or a combination thereof.

7. The method of claim 1, wherein one or more cells in the first cell group or the second cell group associated with the first subscription and the cell associated with the second subscription correspond to a same operator.

8. The method of claim 1, wherein processing the idle-mode signaling comprises:

receiving the idle-mode signaling associated with the second subscription based at least in part on the cell associated with the second subscription roaming from a first operator to a second operator, wherein one or more cells in the first cell group or the second cell group associated with the first subscription are associated with the second operator.

9. The method of claim 1, wherein one or more cells in the first cell group or the second cell group associated with the first subscription and the cell associated with the second subscription correspond to different operators, the method further comprising:

determining the one or more cells in the first cell group or the second cell group associated with the first subscription and the cell associated with the second subscription correspond to a same base station.

10. The method of claim 1, wherein the first radio access technology is Long Term Evolution or New Radio, the second radio access technology is Long Term Evolution or New Radio, or a combination thereof.

11. An apparatus for wireless communications at a user equipment (UE), comprising:

a processor, memory coupled with the processor; and instructions stored in the memory and executable by the processor to cause the apparatus to:

receive configuration signaling that configures a first subscription of the UE and a second subscription of the UE, wherein the first subscription supports dual connectivity with a first cell group associated with a first radio access technology and a second cell group associated with a second radio access technology, and wherein the second subscription supports communications with a cell associated with the first radio access technology, the second radio access technology, or both;

determine that the second subscription supports a same radio access technology as the first subscription and that first time-frequency resources corresponding to first signaling with the first subscription at least partially overlaps with second time-frequency resources corresponding to idle-mode signaling associated with the second subscription, wherein the second subscription is associated with a first protocol stack; and process, during the first time-frequency resources and using a second protocol stack associated with the first subscription based at least in part on the first protocol stack and the second protocol stack being the same, the idle-mode signaling associated with the second subscription based at least in part on the determining.

12. The apparatus of claim 11, wherein the instructions to determine that the second subscription supports the same radio access technology as the first subscription are executable by the processor to cause the apparatus to:

determine that the UE is in a radio resource control connected state; and determine that a radio access technology supported by the second subscription is the same as a radio access technology associated with a master cell group of the first subscription or a radio access technology associated with a secondary cell group of the first subscription based at least in part on determining that the UE is in the radio resource control connected state.

13. The apparatus of claim 11, wherein the instructions to determine that the second subscription supports the same radio access technology as the first subscription are executable by the processor to cause the apparatus to:

determine that the UE is in a radio resource control idle state; and determine that a radio access technology supported by the second subscription is the same as a radio access technology associated with a master cell group of the first subscription based at least in part on determining that the UE is in the radio resource control idle state.

14. The apparatus of claim 11, wherein the instructions to process the idle-mode signaling are executable by the processor to cause the apparatus to:

determine that the cell and one or more additional cells associated with the second subscription are associated with a same operator and have a same tracking area; and receive the idle-mode signaling from the cell associated with the second subscription.

15. The apparatus of claim 11, wherein the instructions to determine that the first time-frequency resources corresponding to the first signaling at least partially overlaps with the second time-frequency resources corresponding to the idle-mode signaling are executable by the processor to cause the apparatus to:

receive an indication of a first set of one or more parameters from a cell in the first cell group or the second cell group associated with the first subscription and a second set of one or more parameters from the cell associated with the second subscription; and determine the first set of one or more parameters at least partially overlaps with the second set of one or more parameters.

16. The apparatus of claim 15, wherein the first set of one or more parameters and the second set of one or more parameters comprise a frequency bandwidth, a cell identifier, a public land mobile network identifier, a master information block, a system information block, or a combination thereof.

17. The apparatus of claim 11, wherein one or more cells in the first cell group or the second cell group associated with the first subscription and the cell associated with the second subscription correspond to a same operator.

18. The apparatus of claim 11, wherein the instructions to process the idle-mode signaling are executable by the processor to cause the apparatus to:

receive the idle-mode signaling associated with the second subscription based at least in part on the cell associated with the second subscription roaming from a first operator to a second operator, wherein one or more cells in the first cell group or the second cell group associated with the first subscription are associated with the second operator.

19. The apparatus of claim 11, wherein one or more cells in the first cell group or the second cell group associated with the first subscription and the cell associated with the second subscription correspond to different operators, wherein the instructions are further executable by the processor to cause the apparatus to determine the one or more cells in the first cell group or the second cell group associated with the first subscription and the cell associated with the second subscription correspond to a same base station.

20. The apparatus of claim 11, wherein the first radio access technology is Long Term Evolution or New Radio, the second radio access technology is Long Term Evolution or New Radio, or a combination thereof.

21. An apparatus for wireless communications at a user equipment (UE), comprising:

means for receiving configuration signaling that configures a first subscription of the UE and a second subscription of the UE, wherein the first subscription supports dual connectivity with a first cell group associated with a first radio access technology and a second cell group associated with a second radio access technology, and wherein the second subscription supports communications with a cell associated with the first radio access technology, the second radio access technology, or both;

means for determining that the second subscription supports a same radio access technology as the first subscription and that first time-frequency resources corresponding to first signaling with the first subscription at least partially overlaps with second time-frequency resources corresponding to idle-mode signaling associated with the second subscription, wherein the second subscription is associated with a first protocol stack; and means for processing, during the first time-frequency resources and using a second protocol stack associated with the first subscription based at least in part on the first protocol stack and the second protocol stack being the same, the idle-mode signaling associated with the second subscription based at least in part on the determining.

22. The apparatus of claim 21, wherein the means for determining that the second subscription supports the same radio access technology as the first subscription comprises:

means for determining that the UE is in a radio resource control connected state; and means for determining that a radio access technology supported by the second subscription is the same as a radio access technology associated with a master cell group of the first subscription or a radio access technology associated with a secondary cell group of the first subscription based at least in part on determining that the UE is in the radio resource control connected state.

23. The apparatus of claim 21, wherein the means for determining that the second subscription supports the same radio access technology as the first subscription comprises:

means for determining that the UE is in a radio resource control idle state; and means for determining that a radio access technology supported by the second subscription is the same as a radio access technology associated with a master cell group of the first subscription based at least in part on determining that the UE is in the radio resource control idle state.

24. The apparatus of claim 21, wherein the means for processing the idle-mode signaling comprises:

means for determining that the cell and one or more additional cells associated with the second subscription are associated with a same operator and have a same tracking area; and means for receiving the idle-mode signaling from the cell associated with the second subscription.

25. The apparatus of claim 21, wherein the means for determining that the first time-frequency resources corresponding to the first signaling at least partially overlaps with the second time-frequency resources corresponding to the idle-mode signaling comprises:

means for receiving an indication of a first set of one or more parameters from a cell in the first cell group or the second cell group associated with the first subscription and a second set of one or more parameters from the cell associated with the second subscription; and means for determining the first set of one or more parameters at least partially overlaps with the second set of one or more parameters.

26. The apparatus of claim 25, wherein the first set of one or more parameters and the second set of one or more parameters comprise a frequency bandwidth, a cell identifier, a public land mobile network identifier, a master information block, a system information block, or a combination thereof.

27. The apparatus of claim 21, wherein one or more cells in the first cell group or the second cell group associated with the first subscription and the cell associated with the second subscription correspond to a same operator.

28. The apparatus of claim 21, wherein the means for processing the idle-mode signaling comprises:

means for receiving the idle-mode signaling associated with the second subscription based at least in part on the cell associated with the second subscription roaming from a first operator to a second operator, wherein one or more cells in the first cell group or the second cell group associated with the first subscription are associated with the second operator.

29. The apparatus of claim 21, wherein one or more cells in the first cell group or the second cell group associated with the first subscription and the cell associated with the second subscription correspond to different operators, the apparatus further comprising means for determining the one or more cells in the first cell group or the second cell group associated with the first subscription and the cell associated with the second subscription correspond to a same base station.

30. The apparatus of claim 21, wherein the first radio access technology is Long Term Evolution or New Radio, the second radio access technology is Long Term Evolution or New Radio, or a combination thereof.

31. A non-transitory computer-readable medium storing code for wireless communications at a user equipment (UE), the code comprising instructions executable by a processor to:
    receive configuration signaling that configures a first subscription of the UE and a second subscription of the UE, wherein the first subscription supports dual connectivity with a first cell group associated with a first radio access technology and a second cell group associated with a second radio access technology, and wherein the second subscription supports communications with a cell associated with the first radio access technology, the second radio access technology, or both;
    determine that the second subscription supports a same radio access technology as the first subscription and that first time-frequency resources corresponding to first signaling with the first subscription at least partially overlaps with second time-frequency resources corresponding to idle-mode signaling associated with the second subscription, wherein the second subscription is associated with a first protocol stack; and
    process, during the first time-frequency resources and using a second protocol stack associated with the first subscription based at least in part on the first protocol stack and the second protocol stack being the same, the idle-mode signaling associated with the second subscription based at least in part on the determining.

32. The non-transitory computer-readable medium of claim 31, wherein the instructions to determine that the second subscription supports the same radio access technology as the first subscription are executable to:
    determine that the UE is in a radio resource control connected state; and
    determine that a radio access technology supported by the second subscription is the same as a radio access technology associated with a master cell group of the first subscription or a radio access technology associated with a secondary cell group of the first subscription based at least in part on determining that the UE is in the radio resource control connected state.

33. The non-transitory computer-readable medium of claim 31, wherein the instructions to determine that the second subscription supports the same radio access technology as the first subscription are executable to:
    determine that the UE is in a radio resource control idle state; and

determine that a radio access technology supported by the second subscription is the same as a radio access technology associated with a master cell group of the first subscription based at least in part on determining that the UE is in the radio resource control idle state.

34. The non-transitory computer-readable medium of claim 31, wherein the instructions to process the idle-mode signaling are executable to:
    determine that the cell and one or more additional cells associated with the second subscription are associated with a same operator and have a same tracking area; and
    receive the idle-mode signaling from the cell associated with the second subscription.

35. The non-transitory computer-readable medium of claim 31, wherein the instructions to determine that the first time-frequency resources corresponding to the first signaling at least partially overlaps with the second time-frequency resources corresponding to the idle-mode signaling are executable to:
    receive an indication of a first set of one or more parameters from a cell in the first cell group or the second cell group associated with the first subscription and a second set of one or more parameters from the cell associated with the second subscription; and
    determine the first set of one or more parameters at least partially overlaps with the second set of one or more parameters.

36. The non-transitory computer-readable medium of claim 35, wherein the first set of one or more parameters and the second set of one or more parameters comprise a frequency bandwidth, a cell identifier, a public land mobile network identifier, a master information block, a system information block, or a combination thereof.

37. The non-transitory computer-readable medium of claim 31, wherein one or more cells in the first cell group or the second cell group associated with the first subscription and the cell associated with the second subscription correspond to a same operator.

38. The non-transitory computer-readable medium of claim 31, wherein the instructions to process the idle-mode signaling are executable to:
    receive the idle-mode signaling associated with the second subscription based at least in part on the cell associated with the second subscription roaming from a first operator to a second operator, wherein one or more cells in the first cell group or the second cell group associated with the first subscription are associated with the second operator.

39. The non-transitory computer-readable medium of claim 31, wherein one or more cells in the first cell group or the second cell group associated with the first subscription and the cell associated with the second subscription correspond to different operators, wherein the instructions are further executable to determine the one or more cells in the first cell group or the second cell group associated with the first subscription and the cell associated with the second subscription correspond to a same base station.

40. The non-transitory computer-readable medium of claim 31, wherein the first radio access technology is Long Term Evolution or New Radio, the second radio access technology is Long Term Evolution or New Radio, or a combination thereof.

* * * * *